United States Patent
Khair

(10) Patent No.: US 7,162,861 B2
(45) Date of Patent: Jan. 16, 2007

(54) METHOD OF IMPROVING PERFORMANCE OF EMISSION CONTROL DEVICES BY CONTROLLING EXHAUST OXYGEN CONTENT

(75) Inventor: Magdi K. Khair, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 11/054,216

(22) Filed: Feb. 9, 2005

(65) Prior Publication Data
US 2005/0193723 A1 Sep. 8, 2005

Related U.S. Application Data

(60) Provisional application No. 60/543,138, filed on Feb. 10, 2004.

(51) Int. Cl.
*F01N 5/04* (2006.01)

(52) U.S. Cl. .............. 60/280; 60/274; 60/295; 60/297; 60/605.1; 60/606; 60/611

(58) Field of Classification Search .............. 60/274, 60/280, 286, 295, 297, 301, 605.1, 605.2, 60/605.3, 606, 611; 123/564
See application file for complete search history.

(56) References Cited

U.S. PATENT DOCUMENTS

| | | | | | |
|---|---|---|---|---|---|
| 5,105,620 | A | * | 4/1992 | Matsumura | ............ 60/290 |
| 5,709,081 | A | * | 1/1998 | Bruestle | ............ 60/274 |
| 5,894,728 | A | * | 4/1999 | Wakamoto | ............ 60/286 |
| 6,227,180 | B1 | * | 5/2001 | Hoffmann et al. | ....... 123/564 |
| 6,546,721 | B1 | * | 4/2003 | Hirota et al. | ............ 60/297 |
| 6,915,629 | B1 | * | 7/2005 | Szymkowicz | ............ 60/289 |
| 6,922,996 | B1 | * | 8/2005 | Ellmer et al. | ............ 60/608 |
| 6,957,535 | B1 | * | 10/2005 | Sumser et al. | ............ 60/607 |
| 2004/0103646 | A1 | * | 6/2004 | Weigand et al. | ............ 60/280 |
| 2004/0122583 | A1 | * | 6/2004 | Plote et al. | ............ 701/108 |
| 2005/0011184 | A1 | * | 1/2005 | Price et al. | ............ 60/286 |
| 2006/0112680 | A1 | * | 6/2006 | Beer et al. | ............ 60/284 |

OTHER PUBLICATIONS

Khair, Magdi K., "Diesel Particulate Analysis for Effective Exhaust Aftertreatment", Truck Altenative Fuels and Exhaust Gas Emission (SP-1001), SAE Technical Papers Series 932954, pp. 61-69.
PCT International Search Report & Written Opinion, PCT/US05/04210, 10 pages.

* cited by examiner

*Primary Examiner*—Tu M. Nguyen
(74) *Attorney, Agent, or Firm*—Baker Botts L.L.P.

(57) ABSTRACT

A method of providing extra air to the exhaust stream of an internal combustion engine. A small flow of air is diverted from the output of an air-charging device, such as a turbocharger, to an entry point upstream of an emission control device. The air is supplied in a controllable fashion so as to improve the efficiency of the emission control device.

20 Claims, 4 Drawing Sheets

METHOD OF IMPROVING PERFORMANCE OF EMISSION CONTROL DEVICES BY CONTROLLING EXHAUST OXYGEN CONTENT

RELATED PATENT APPLICATION

This application claims the benefit of U.S. Provisional Application No. 60/543,138, filed Feb. 10, 2004 and entitled "METHOD OF IMPROVING PERFORMANCE OF EMISSION CONTROL DEVICES BY CONTROLLING EXHAUST OXYGEN CONTENT".

TECHNICAL FIELD OF THE INVENTION

This invention relates to reducing exhaust emissions from internal combustion engines, and more particularly to controlling exhaust oxygen upstream of emission control devices.

BACKGROUND OF THE INVENTION

Internal combustion engines used for both mobile and stationary applications are subject to strict emission limits. One approach to reducing emissions is to improve in-cylinder designs, but these improvements have fallen short of meeting emissions limits. Other approaches involve exhaust aftertreatment devices, which have achieved significant emissions reductions.

For diesel engines, the main pollutants of concern are nitrogen oxides (NOx) and particulate matter (PM). The latter is composed of black smoke (soot), sulfates generated by the sulfur in fuel, and organic components of unburned fuel and lubricating oil.

To reduce NOx, one approach is the use of NOx reduction catalysts, such as lean NOx traps (LNTs). To reduce PM, one approach is the use of various types of diesel particulate filters (DPFs). These devices may be used alone or together, with either or both being used downstream of the engine, in the exhaust line. Both operate in repeated loading and regeneration cycles.

For regeneration of NOx reduction catalysts, the oxygen content in the exhaust is reduced. This reduced oxygen content is usually combined with increased exhaust hydrocarbon content, to obtain the rich mixture needed for the $NO_x$ regeneration process.

A diesel oxidation catalyst (DOC) is often placed upstream from a LNT. The purpose of the DOC is to condition the exhaust hydrocarbon or reform it to obtain the ideal reductant for LNT regeneration. Indications are that DOC performance improves with increased engine speed, airflow, and hence oxygen content.

In addition, for regeneration of DPFs, elevated exhaust gas temperature and increased oxygen content both contribute to increased regeneration activity. For this purpose, a DOC is often placed upstream of a DPF to form $NO_2$ from NO.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The invention described herein involves a recognition that controlling exhaust oxygen can improve the efficiency of many exhaust emissions control devices, particularly catalytic devices. For purposes of example herein, the invention is described for use with emissions control devices such as DPFs, SCRs, and LNTs. However, the invention is not limited to use with these devices, and may be used to control oxygen supplied to any device in the exhaust line of a combustion engine.

The method and system described herein control the oxygen content in exhaust gas by providing a controllable portion of "bleed air" from the output of an air-charging device, such as a turbocharger or supercharger. This oxygen control capitalizes on the features of modern air-charging devices, such as variable geometry turbochargers and electrically or hydraulically assisted superchargers. These air-charging devices are capable of providing a variable charged airflow rate. The invention is not limited to these types of air-charging devices, and may be used with any air-charging device whose output can be adjusted in some manner, whether by continuous or incremental adjustment or by on/off (i.e., duty cycle) type control.

In accordance with the invention, a relatively small portion of the charged air is diverted from the normal (engine-destined) output of the air-charging device. This diverted air provides an additional supply of oxygen to the exhaust just upstream from one or more emissions control devices. The exhaust gas may be augmented with oxygen by whatever amount is required for efficiency improvement of a particular emissions control device. The output of the air-charging device is adjusted to compensate for the diverted air.

Figure 1:
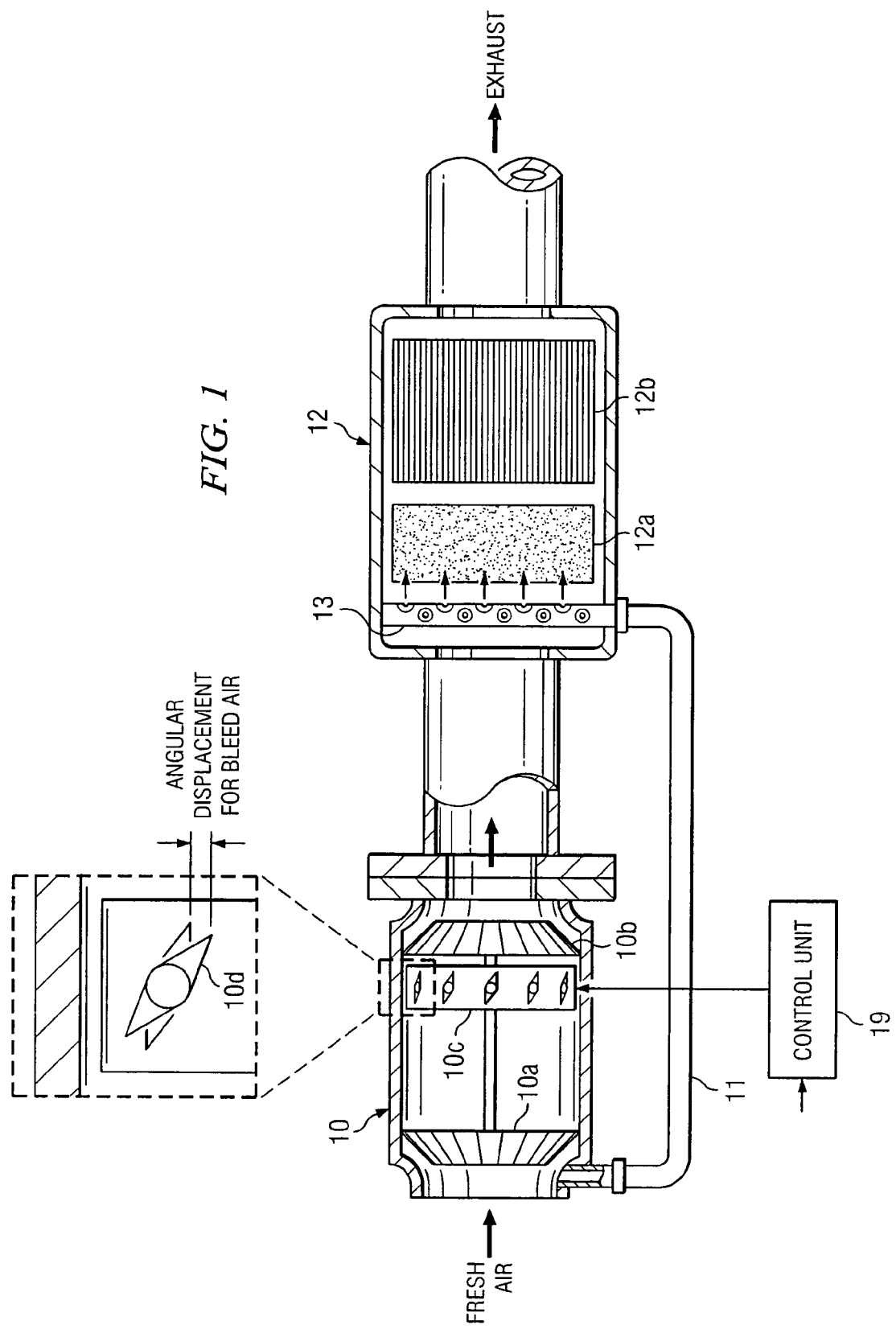
FIG. 1 illustrates one example of an emissions treatment system having an air-charging device and bleed air path in accordance with the invention.

FIG. 1 illustrates an exhaust aftertreatment system 100 having oxygen-enhanced exhaust in accordance with the invention. In the example of FIG. 1, the "air-charging device" is a variable geometry turbocharger 10. Ambient air enters the front of the turbocharger's compressor 10a. Conventionally, when charged air exits compressor 10a, it flows to the engine's intake manifold after being cooled in an air-to-air intercooler (not shown). For simplicity, FIG. 1 does not explicitly show this conventional charged air path.

In addition to the conventional charged air path, the discharge air from compressor 10a includes a small stream, referred to herein as a "bleed air" path 11, taken from the compressor housing (volute). This bleed air path 11 connects to the upstream side of the exhaust emission control device 12.

The turbine 10b of turbocharger 10 has a means for adjusting its output, here illustrated as a variable nozzle ring 10c. It uses a set of vanes 10d, whose angle may be adjusted to adjust the flow of air into turbine 10b. Variable nozzle ring 10c is but one example of an air-charging device's "output adjuster", any of whose operation may be controlled in accordance with the invention. The air-charging device 10 may have an output that is incrementally or continuously variable, or it may be simply an on/off type device.

To provide bleed air into path 11 without affecting the normal engine air-charging function of turbocharger 10, the turbocharger's charged air output is adjusted. The adjustment may be implemented by a control device 19.

In the example of FIG. 1, it is the angle of vanes 10d that is adjusted. This type of adjustment may be continuous (i.e., to any desired angle) or done in increments. The adjustment of air into turbine 10b causes the turbine wheel to rotate at a higher speed, thus driving the compressor 10a at higher speed. This action augments the charge air by a desired bleed air amount.

A perforated tube 13 may be positioned at the exhaust input to emissions device 12 to evenly distribute air into device 12. It may be sized and shaped to provide air to the entire frontal area of the device 12.

Control unit 19 may be processor-based, programmed to control the charged air output of a turbocharger 10 in accordance with the methods described herein. The control methods may include control of the turbine, which in turn affects the compressor output, or direct control of the compressor output.

In general, control unit 19 may be implemented with various controller devices known or to be developed. Further, control unit 19 may be an engine control unit that controls various other engine and/or emissions devices. Control unit 19 controls the output of the air-charging device 10 so that the diversion of air does not adversely affect the normal operation of the air-charging device. For example, control unit 19 may be a processor-based device, programmed to calculate how much the charged air output of air-charging device 10 should be increased when air is diverted to bleed path 11.

In general, the function of control unit 19 may be described as to "compensate" for the diverted air such that the normal operation of the air-charging device is not substantially affected in an adverse manner. It is also possible to have a system whose air-charging device has a built-in adjustment to compensate for the bleed air.

In the example of FIG. 1, emissions control device 12 is a two-stage device, having a diesel oxidation catalyst (DOC) 12a in front of diesel particulate filter (DPF) 12b. This arrangement is described in U.S. Pat. No. 4,902,487, entitled Treatment of Diesel Exhaust Gases, to B. Cooper, et al, and assigned to Johnson Matthey Inc. The DOC 12a converts exhaust nitric oxide (NO) to $NO_2$ using excess exhaust oxygen.

The present invention improves the performance of the DOC 12a by providing additional oxygen, thus enhancing the formation of $NO_2$ for regeneration. The DPF 12b can be catalyzed or non-catalyzed.

In other embodiments, the second stage 12b of emissions control device 12 could be a selective catalytic reduction (SCR) device, instead of a DPF. In this case, the amount of bleed air can be controlled to vary the supply of excess oxygen to the first stage exhaust treatment in order to control the $NO/NO_2$ ratio, which is an important parameter in the control of SCR $NO_x$ reduction efficiency. Examples of SCR devices are urea and ammonia SCR devices.

In further embodiments, the second stage 12b of emissions control device 12 could be an LNT. In this case, bleed air could be used to enhance the efficiency of DOC 12a and further convert NO to $NO_2$, which is desirable to improve the storage capability of the LNT. However, excess oxygen is not desirable during the regeneration of LNTs. During regeneration, rich exhaust and thus reduced exhaust oxygen is desirable, and bleed air may be controlled accordingly.

In general, emissions control device 12 may be any device whose operation is enhanced by the addition of oxygen. Emissions control device can be a single stage device, such as a DPF, SCR, or LNT, or a multi-stage device, such as a combination of DPF, SCR, or LNT devices, which may or may not be preceded by a DOC. The addition of oxygen can be continuous or only during certain phases of operation of emissions control device 12.

Figure 2:
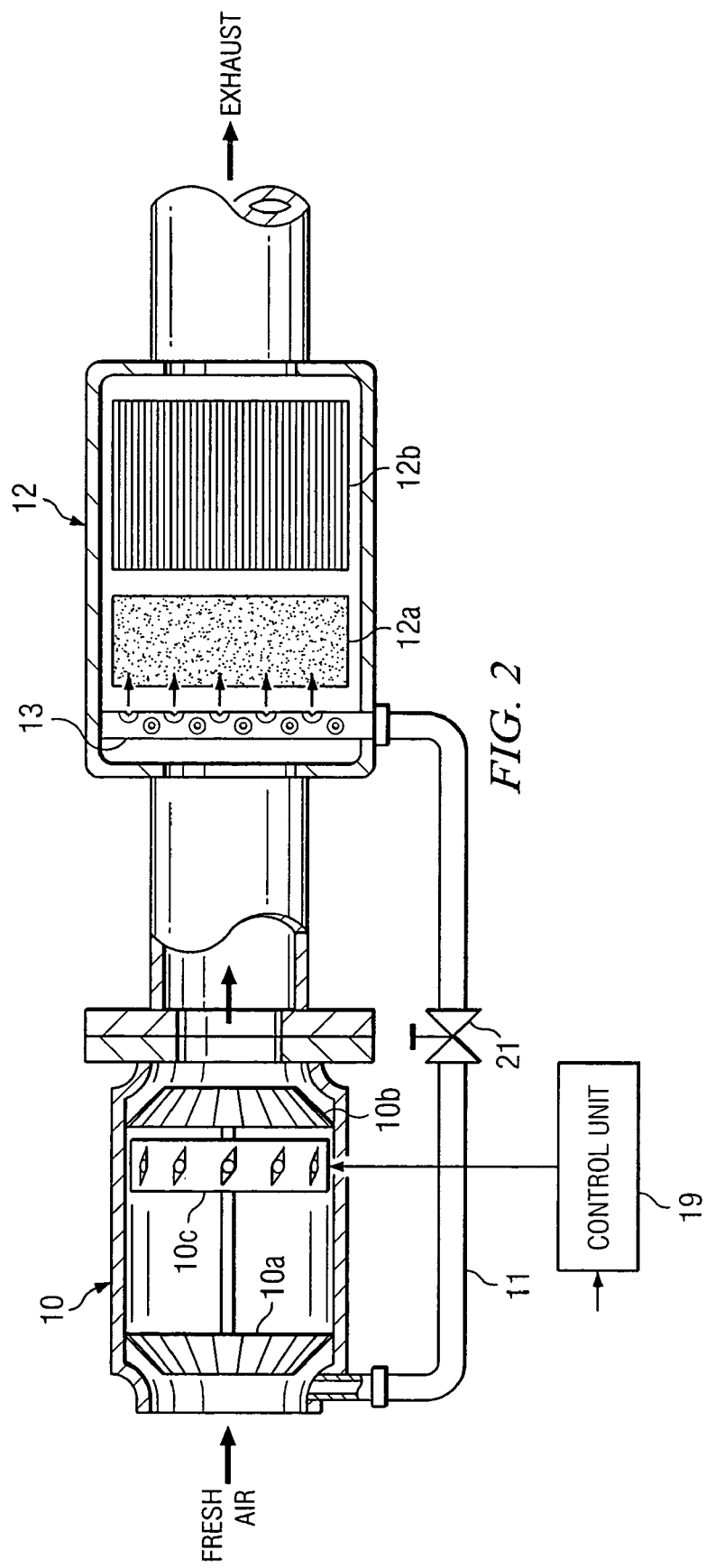
FIG. 2 illustrates the system of FIG. 1, but with a valve in the bleed air path.

FIG. 2 illustrates the system of FIG. 1, but with a valve 21 provided in the bleed air path 11. Valve 12 may be used to provide a positive shut off of the bleed air, and thereby prevent the flow of additional oxygen in the exhaust. An example of use of valve 21 in the manner is for LNT regeneration as explained above in connection with FIG. 2.

An example of a suitable valve 21 is a solenoid-actuated electrical valve. Valve 21 may be an on-off type valve, or it may permit a variable air flow rate.

Figure 3:
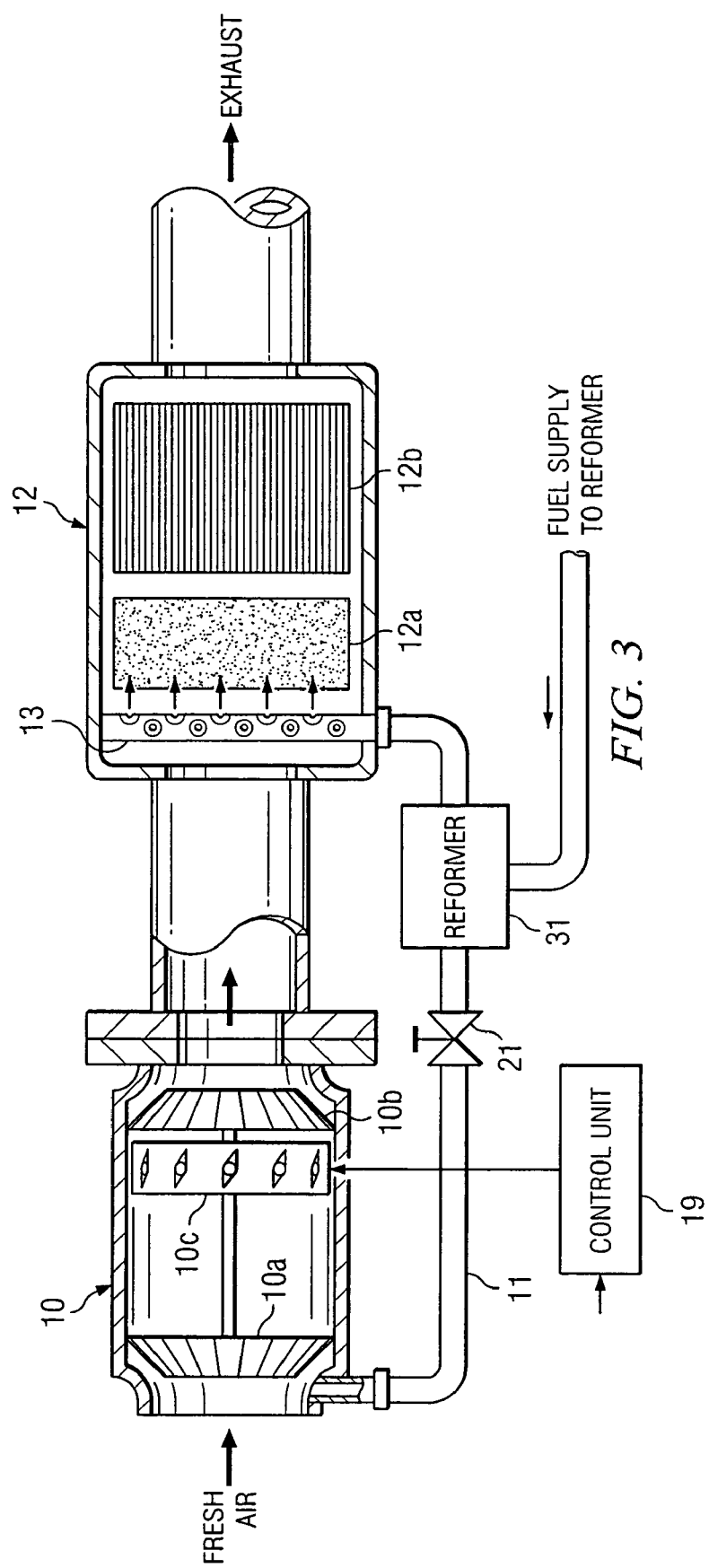
FIG. 3 illustrates the system of FIG. 2, but with a reformer between the valve and the inlet for the bleed air into the emissions control device.

FIG. 3 illustrates an optional fuel reformer 31 on the bleed air path 11. Having established the need for controlling the composition of exhaust for various emissions control operations, onboard reformers have been developed. Reformer 31 typically has a catalyst, and is provided with a supply of fuel and a supply of air.

Valve 21 is suitable for accurately setting air flow rates and supplying controlled air to the reformer 31. A supply line 32 may be used to supply fuel or any other liquid or gas consumed by the reformer 31.

The above configurations give a generalized description of the system's operation to enhance the performance of various diesel exhaust emission treatment devices, referred to collectively as emissions control devices 12. For these illustrations and examples, a variable geometry turbocharger 10 was used as the air-charging device.

Figure 4:
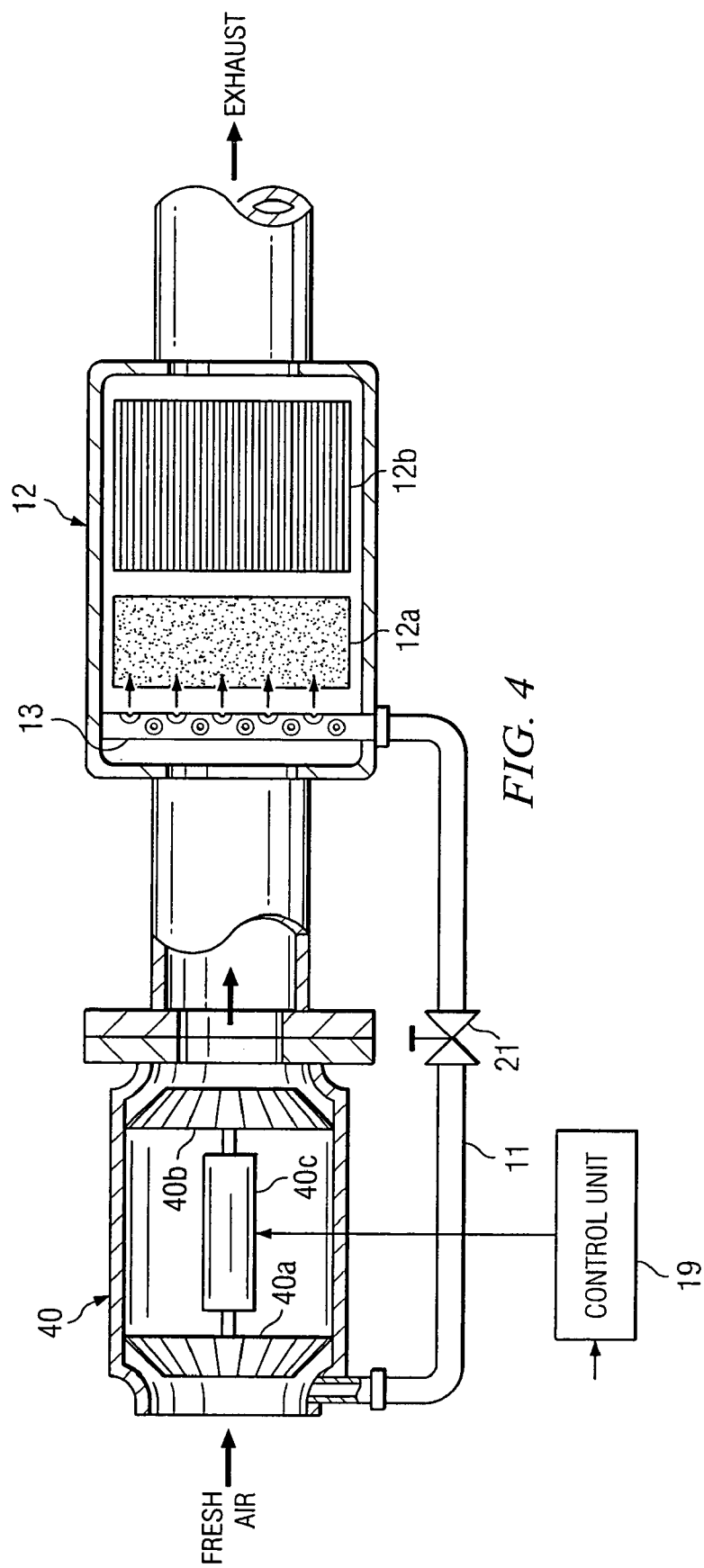
FIG. 4 illustrates the system of FIG. 2, but with an electrically or hydraulically assisted turbocharger as the air-charging device.

FIG. 4 illustrates a method and system of providing a bleed air path to an emissions control device 12, using an electrically or hydraulically assisted supercharger 40 as the air-charging device. These air-charging devices can be thought of as providing motorized supercharging in combination with the regular turbocharging function, and provide added flexibility in air charge control. One of their more popular functions is to boost air during hard accelerations.

The present invention provides an added function to the usefulness of such devices. Here, motor 40c is the "output adjuster", and its operation is controlled by control unit 19. By increasing the speed of the motor 40c, the speed of compressor 40a is increased and with it the air flow delivery to the turbine 40b. A mechanically driven air-charging device can be subjected to the same control principles.

What is claimed is:

1. A method of controlling the air content input to an engine exhaust aftertreatment system, wherein the engine has an air-charging device having a volute and an integral output adjustment mechanism, comprising:

diverting a portion of the charged air output from the volute of the air-charging device;

delivering the portion to a point upstream of an exhaust emissions control device;

diffusing the portion using a diffuser at the input to emissions control device;

calculating an amount to adjust the operation of the air-charging device such that normal operation of the air-charging device not affected by the diverted portion; and increasing the output of the air-charging device to compensate for the diverted portion;

wherein the adjusting step is performed using an adjustment mechanism integral to the air-charging device.

2. The method of claim 1, wherein the emissions control device has an oxidation catalyst.

3. The method of claim 1, wherein the emissions control device has a diesel particulate filter.

4. The method of claim 1, wherein the emissions control device has a lean NOx trap.

5. The method of claim 1, wherein the emissions control device has a selective catalytic reduction device.

6. The method of claim 1, wherein the adjusting step is performed by turning an output adjuster device on or off.

7. The method of claim 1, wherein the adjusting step is performed by controlling a continuously or incrementally variable output adjuster device.

8. The method of claim 1, wherein the portion of charged air is delivered via a bleed line, and further comprising a valve to control the flow of the charged air to the emissions control device.

9. The method of claim 1, wherein the portion of charged air is delivered via a bleed line, and further comprising a reformer device along the bleed line.

10. The method of claim 1, wherein the air-charging device is selected from the group of: a variable geometry turbocharger, an electrically assisted supercharger, a hydraulically assisted supercharger, or a mechanically driven supercharger.

11. A diesel engine exhaust aftertreatment system used with an engine having an air-charging device and having at least one emissions control device, comprising:
    a bleed line from the air-charging device for diverting a portion of the charged air output from the housing of the air-charging device;
    a diffuser, located at the input to the emissions control device, for receiving the diverted air in the bleed line and for diffusing the portion of charged air into the emissions control device; and
    a control unit in electrical communication with the air-charging device for calculating a compensation value representing an amount to increase the output of the air-charging device to compensate for diversion of the portion of charged air, and for delivering a control signal to the air-charging device to adjust the output of the air-charging device to compensate for the diverted air flow.

12. The system of claim 11, wherein the emissions control device has an oxidation catalyst.

13. The system of claim 11, wherein the emissions control device has a diesel particulate filter.

14. The system of claim 11, wherein the emissions control device has a lean NOx trap.

15. The system of claim 11, wherein the emissions control device has a selective catalytic reduction device.

16. The system of claim 11, wherein the adjusting step is performed by turning an output adjuster device on or off.

17. The system of claim 11, wherein the adjusting step is performed by controlling a continuously or incrementally variable output adjuster device.

18. The system of claim 11, further comprising a valve in the bleed line to control the flow of the charged air to the emissions control device.

19. The system of claim 11, further comprising a reformer device along the bleed line.

20. The system of claim 11, wherein the air-charging device is selected from the group of: a variable geometry turbocharger, an electrically assisted supercharger, a hydraulically assisted supercharger, or a mechanically driven supercharger.

* * * * *